US009539955B2

(12) United States Patent
Earley et al.

(10) Patent No.: US 9,539,955 B2
(45) Date of Patent: Jan. 10, 2017

(54) SEATBELT MOUNT FOR A COMPUTING DEVICE

(71) Applicant: R+L Carriers, Inc., Wilmington, OH (US)

(72) Inventors: Brian L. Earley, Wilmington, OH (US); Terry L. King, Waynesville, OH (US); David Mark Vance, Wilmington, OH (US); Eric J. Bauer, Tecumseh, MI (US)

(73) Assignee: R & L Carriers, Inc., Wilmington, OH (US)

( * ) Notice: Subject to any disclaimer, the term of this patent is extended or adjusted under 35 U.S.C. 154(b) by 219 days.

(21) Appl. No.: 14/143,088

(22) Filed: Dec. 30, 2013

(65) Prior Publication Data

US 2015/0183381 A1 Jul. 2, 2015

(51) Int. Cl.
*B60R 11/02* (2006.01)
*B60R 11/00* (2006.01)

(52) U.S. Cl.
CPC .... *B60R 11/0252* (2013.01); *B60R 2011/0031* (2013.01); *B60R 2011/0059* (2013.01)

(58) Field of Classification Search
CPC ............... B60R 11/0252; B60R 2011/0059; B60R 2011/0061; B60R 2011/0031
USPC ......................................... 224/296, 275, 929
See application file for complete search history.

(56) References Cited

U.S. PATENT DOCUMENTS

| | | | |
|---|---|---|---|
| 6,750,764 B1 | 6/2004 | Henninger | |
| 6,966,519 B2* | 11/2005 | Salentine | A45F 5/004 224/162 |
| 8,818,465 B1* | 8/2014 | Gorham, Jr. | H04M 1/04 455/575.1 |
| 8,931,673 B2* | 1/2015 | Stevens, IV | A41F 9/002 224/671 |
| 2003/0164389 A1* | 9/2003 | Byers | A44C 5/0007 224/221 |
| 2005/0115999 A1* | 6/2005 | Johnson | A45F 5/004 224/269 |
| 2008/0190975 A1* | 8/2008 | Naughton | A45F 5/02 224/269 |
| 2009/0233656 A1* | 9/2009 | Ross, III | A45F 5/02 455/575.1 |
| 2011/0132950 A1* | 6/2011 | Culver | B60R 11/0241 224/485 |

FOREIGN PATENT DOCUMENTS

| | | |
|---|---|---|
| CN | 202566605 | 12/2012 |
| DE | 3904107 | 8/1990 |

* cited by examiner

*Primary Examiner* — Corey Skurdal
(74) *Attorney, Agent, or Firm* — Dinsmore & Shohl LLP

(57) ABSTRACT

A securing mechanism for securing a computing device within a vehicle includes a first end and a second end. A top face and a bottom face extend from the first end to the second end, and the securing mechanism is folded such that the bottom face at the first end is proximate to the bottom face at the second end, defining a channel configured to receive a portion of a seatbelt of the vehicle. The securing mechanism also includes an attachment mechanism that is configured to attach the securing mechanism to the computing device. In various embodiments, the securing mechanism is attached to the computing device at a point below a center of gravity for the computing device.

14 Claims, 2 Drawing Sheets

SEATBELT MOUNT FOR A COMPUTING DEVICE

BACKGROUND

Field

The present specification generally relates to securing mechanisms and, more specifically, to mechanism for securing a mobile computing device within a vehicle.

Technical Background

In-cab mounted computers (sometimes called a "mobile data terminal" or "MDT") enable a truck driver to process bills of lading and scan documents from the truck back to the office. The computing device, when equipped with a GPS receiver, can also allow the dispatcher to track the location and route progress for the driver and manage the productivity of the fleet. The computing device may also connect to the truck's internal computing system to provide information regarding preventative maintenance and engine fault codes, fuel economy, speed, and odometer mileage.

Computing devices may be mounted within the cab of the truck to reduce the likelihood that the driver will drop, damage, or lose the computing device or to reduce wear on the computing device. Although mounting the computing device within the cab provides protection for the device, existing mounting techniques may render it difficult to quickly remove the computing device from the mounting. Thus, the company may need to rent additional trucks to handle business level spikes or to replace company-owned trucks that are being repaired, leaving the driver without a computing device. A driver who personally purchases a computing device may drive for multiple carriers or be in different trucks during the day. Accordingly, there is a need for a mount for a computing device that enables the computing device to be easily removed for transfer between trucks.

SUMMARY

According to one embodiment, a securing mechanism for securing a computing device within a vehicle includes a first end and a second end. A top face and a bottom face extend from the first end to the second end, and the securing mechanism is folded such that the bottom face at the first end is proximate to the bottom face at the second end, defining a channel configured to receive a portion of a seatbelt of the vehicle. The securing mechanism also includes an attachment mechanism that is configured to attach the securing mechanism to the computing device.

In another embodiment, a system for securing a mobile device within a vehicle is described. The system includes the mobile device and a securing mechanism associated with the mobile device and configured to secure the mobile device within the vehicle by receiving a portion of a seatbelt of the vehicle. The securing mechanism includes a first end and a second end; a top face and a bottom face extending from the first end to the second end, the securing mechanism being folded in a u-shape such that the bottom face at the first end is proximate to the bottom face at the second end defining a channel configured to receive the portion of the seatbelt; and an attachment mechanism configured to associate the securing mechanism with the mobile device.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
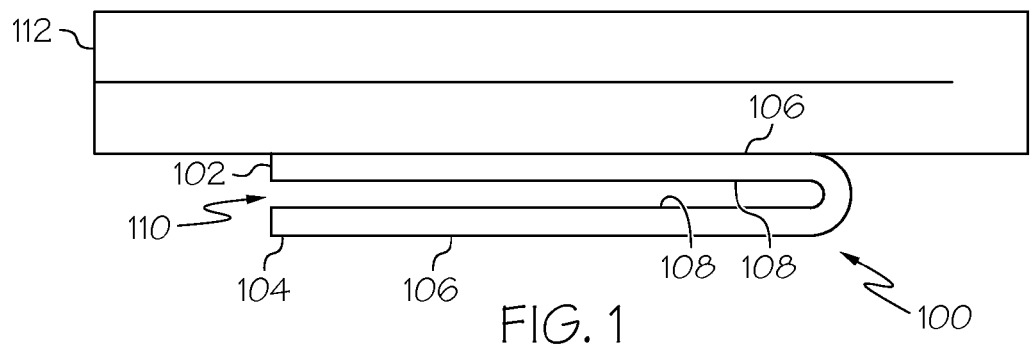
FIG. 1 illustrates a side view of a securing mechanism according to one or more embodiments shown and described herein.

Reference will now be made in detail to various embodiments, examples of which are illustrated in the accompanying drawings. Whenever possible, the same reference numerals will be used throughout the drawings to refer to the same or like parts. One embodiment of the securing mechanism is shown in FIG. 1, and is designated generally throughout by the reference numeral 100.

As depicted in FIG. 1, the securing mechanism 100 includes a first end 102 and a second end 104. A top face 106 and a bottom face 108 extend from the first end 102 to the second end 104. In various embodiments, the securing mechanism 100 is folded such that the bottom face 108 of the first end 102 is proximate to the bottom face 108 of the second end 104. Thus, the securing mechanism 100 can have a u-shape, a v-shape, a j-shape, or otherwise be folded to define a channel 110 that is configured to receive a portion of a seatbelt. For example, the channel 110 can be configured to receive a lap portion of the seatbelt, a shoulder portion of the seatbelt, or a lap portion and a shoulder portion of the seatbelt to secure a computing device 112 in place. The computing device 112 can be, for example, a computer, a mobile terminal device, a mobile scanner, or any other computing device.

The securing mechanism 100 may be made of any metal, plastic, or laminate material. For example, the securing mechanism 100 may be made from steel, molded plastic, or another durable material.

Figure 2:
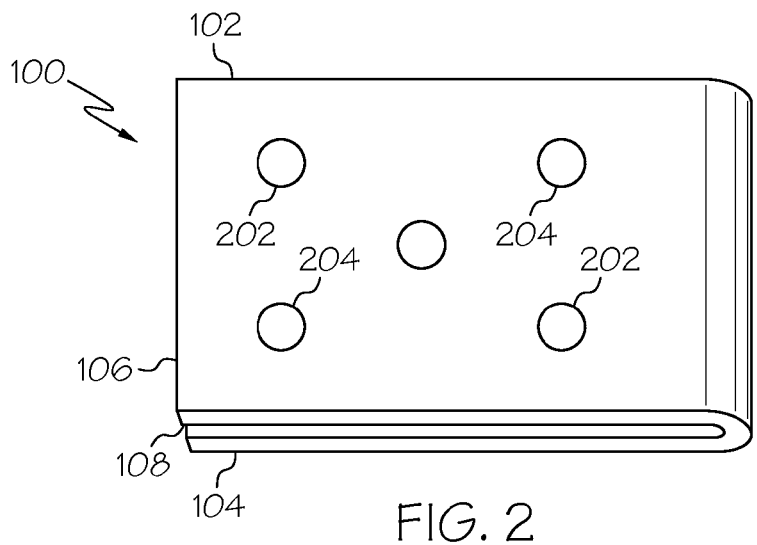
FIG. 2 schematically depicts a top view of a securing mechanism according to one or more embodiments shown and described herein.

FIG. 2 illustrates a top view portion of the securing mechanism 100. As shown in FIG. 2, the securing mechanism 100 includes an attachment mechanism 202 to associate the securing mechanism 100 to the computing device. The attachment mechanism 202 illustrated in FIG. 2 is a set of holes 204 through the top face 106 and the bottom face 108. However, in other embodiments, the attachment mechanism 202 may be an adhesive, weld, bolt, screw, nail, clip, hook and loop structure (e.g., Velcro®), or another attachment mechanism configured to attach the securing mechanism 100 to the computing device 112.

Figure 3:
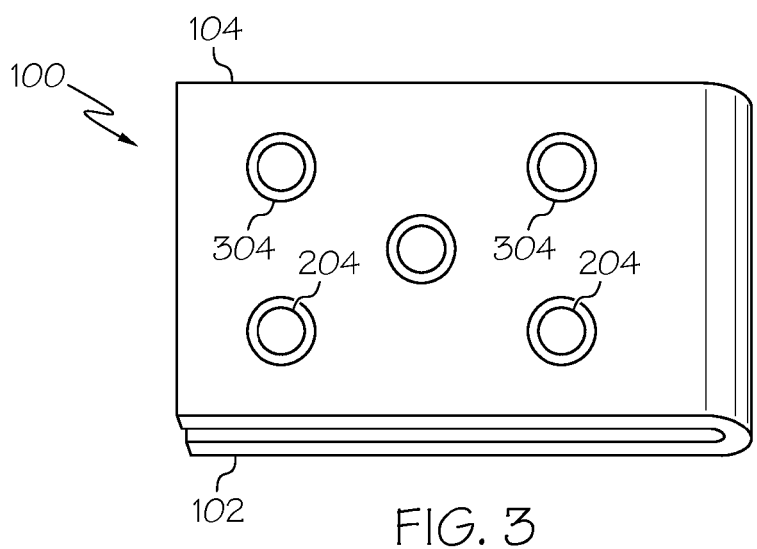
FIG. 3 schematically depicts a bottom view of a securing mechanism according to one or more embodiments shown and described herein.

In various embodiments, the set of holes 204 is near the first end 102 of the securing mechanism 100. The securing mechanism 100 may additionally have a set of holes 304 through the top face 106 and the bottom face 108 located near the second end 104, as illustrated in FIG. 3. In some embodiments, each hole in the set of holes 204 and the set of holes 304 can be the same size. However, in other embodiments, such as the one illustrated in FIG. 3, the set of holes 204 in the first end 102 may be smaller in diameter than the set of holes 304 in the second end 104. The sets of holes in the first end 102 and the second end 104 can be oriented such that each bolt in a set of bolts passes through a hole in the set of holes 304 and into a hole in the set of holes 204 and into the computing device 112 to secure the securing mechanism 100 to the computing device 112. For example, each hole in the set of holes 304 may have a diameter larger than a maximum diameter of each bolt in the set of bolts, and each hole in the set of holes 204 may have a diameter smaller than the maximum diameter of each bolt. The maximum diameter of each bolt can be, for example, the diameter of the head of the bolt. Thus, each bolt will pass through the set of holes 304 entirely and engage the securing mechanism 100 around the set of holes 204 to associate the securing mechanism 100 with the computing device 112.

Each set of holes 204, 304 can be arranged in any suitable pattern. In some embodiments, each set of holes 204, 304 is arranged in a standard VESA pattern. When a set of bolts is utilized to secure the securing mechanism 100 to the computing device 112, the computing device 112 may additionally have a set of holes configured to receive the set of bolts. When another type of attachment mechanism 202 is used, the computing device 112 may or may not include a corresponding structure to enable the securing mechanism 100 to be associated with the computing device 112.

The securing mechanism 100 may be associated with the computing device 112 in a variety of ways and in a variety of locations on the computing device 112. In various embodiments, such as the one illustrated in FIG. 1, the securing mechanism 100 is secured to the computing device 112 on a bottom side or a bottom face of the computing device 112. In some embodiments, the securing mechanism 100 is secured to the computing device 112 at a point below the center of gravity of the computing device 112. Associating the securing mechanism 100 to the computing device 112 at a point below the center of gravity of the computing device 112 can reduce the likelihood that the computing device 112 will flip over when the vehicle comes to a stop or makes a sharp turn. In still other embodiments, the securing mechanism 100 may be secured to the computing device 112 at any location.

Although the securing mechanism 100 is described herein as being associated with, attached to, or secured to the computing device 112, it is to be understood that the securing mechanism 100 may be directly or indirectly associated with, attached to, or secured to the computing device 112. For example, a set of bolts may pass through the sets of holes 204, 304 and into an additional set of holes in the bottom of the computing device 112. As another example, the set of bolts may pass through the sets of holes 204, 304 and into a set of holes in the bottom of a case in which the computing device 112 is secured. The securing mechanism 100 may be permanently associated with the computing device 112 or the securing mechanism 100 may be temporarily or removeably associated with the computing device 112, depending on the particular embodiment.

Figure 4:
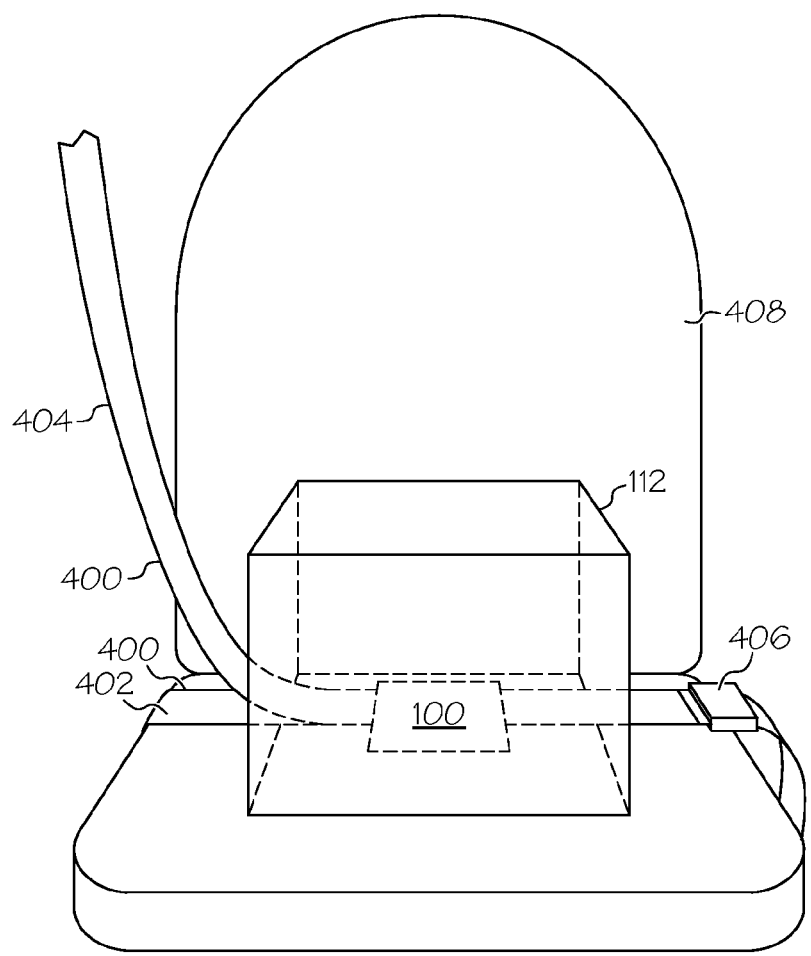
FIG. 4 schematically depicts a system for securing a mobile device within a vehicle according to one or more embodiments shown and described herein.

FIG. 4 depicts a computing device 112 including a securing mechanism 100 according to one or more embodiments. As can be seen in FIG. 4, the securing mechanism 100 is attached to the bottom of the computing device 112. The securing mechanism 100 is configured to receive a portion of the seatbelt 400. In the embodiment depicted, a lap portion 402 and a shoulder portion 404 of the seatbelt 400 are received by the securing mechanism 100. In particular, the lap portion 402 and the shoulder portion 404 are received by the channel 110, and extend under the computing device 112 that is positioned on the seat 408. The seatbelt 400 is inserted into the buckle 406 and may be tightened by pulling up on the shoulder portion 404 to secure the computing device 112.

Although in the embodiment depicted in FIG. 4 the securing mechanism 100 receives both the lap portion 402 and the shoulder portion 404 of the seatbelt 400, in other embodiments, the securing mechanism 100 may receive the lap portion 402 or the shoulder portion 404 of the seatbelt 400. For example, the securing mechanism 100 may receive the lap portion 402 of the seatbelt 400 while the shoulder portion 404 of the seatbelt 400 is positioned between the back of the seat 408 and the computing device 112.

Figure 5:
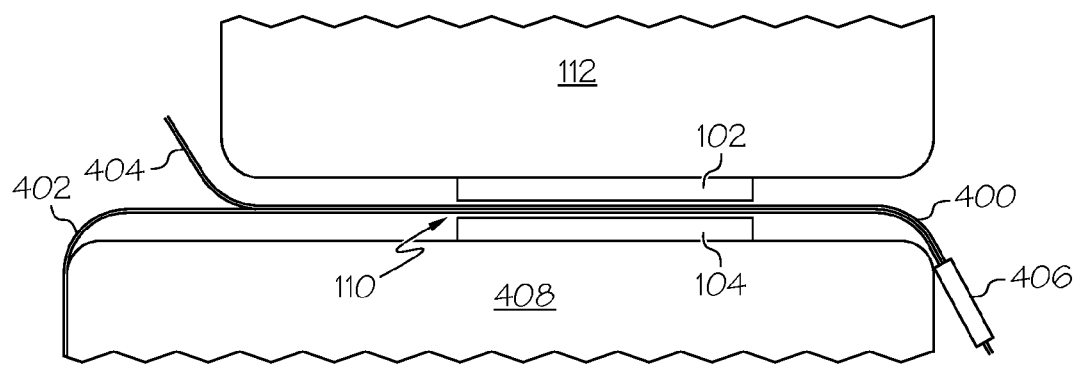
FIG. 5 schematically depicts a system for securing a mobile device within a vehicle according to one or more embodiments shown and described herein.

FIG. 5 is a front view of a computing device 112 including the securing mechanism 100 positioned on the seat 408 in accordance with one or more embodiments. As illustrated in FIG. 5, in various embodiments, the securing mechanism 100 is oriented such that the first end 102 and the second end 104 are towards a front end of the vehicle while a center portion (e.g., the u-shaped portion) of the securing mechanism 100 is towards a rear end of the vehicle. In other words, the securing mechanism 100 is open towards the front and closed towards the back in order to prevent the computing device 112 from moving forward off the seat 408 when the vehicle stops or decelerates rapidly. Accordingly, when the seat belt 400 is inserted into the buckle 406, the channel 110 of the securing device 100 receives the lap portion 402 and the shoulder portion 404.

It should now be understood that various embodiments described herein enable a computing device to be securely mounted within a vehicle while being easily removable. For example, a truck driver having a computing device with a securing mechanism according to the described embodiments can transfer the computing device from one truck to another by simply unbuckling the seatbelt and removing the portion of the seatbelt from within the channel of the securing mechanism. The transfer of the computing device from one vehicle to another does not require the use of any specialized tools, and can be completed in minimal time.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:
1. A system for securing a computing device within a vehicle, the system comprising:
the computing device;
a securing mechanism comprising:

a first end and a second end, the first end being spaced apart from and substantially parallel to the second end;

a top face and a bottom face extending from the first end to the second end, the securing mechanism being folded such that the bottom face at the first end is proximate to the bottom face at the second end defining a channel; and an attachment mechanism comprising a set of holes through the top face and the bottom face configured to receive a set of bolts, wherein each bolt in the set of bolts is inserted through a hole in the set of holes and into the computing device to attach the securing mechanism to the computing device; and a seatbelt comprising at least a shoulder portion and a lap portion, at least the lap portion extending through the channel of the securing mechanism to secure the computing device against a seat of the vehicle.

2. The system of claim 1, wherein the set of holes is arranged in a VESA pattern.

3. The system of claim 1, the set of holes being a first set of holes and being located near the first end of the securing mechanism, the securing mechanism further comprising a second set of holes through the top face and the bottom face, the second set of holes being located near the second end of the securing mechanism and oriented such that the each bolt passes through a hole in the first set of holes, a hole in the second set of holes, and into the computing device to attach the securing mechanism to the computing device.

4. The system of claim 3, wherein each hole in the first set of holes has a diameter larger than a maximum diameter of each bolt in the set of bolts and each hole in the second set of holes has a diameter smaller than the maximum diameter of each bolt such that the set of bolts passes through the first set of holes entirely.

5. The system of claim 1, wherein the bracket is folded into a u-shape.

6. The system of claim 1, wherein the securing mechanism is attached to the computing device on a bottom side of the computing device.

7. A system for securing a mobile device within a vehicle, the system comprising:

the mobile device;

a vehicle seat;

a securing mechanism associated with the mobile device, the securing mechanism comprising:

a first end and a second end, the first end being spaced apart from and substantially parallel to the second end;

a top face and a bottom face extending from the first end to the second end, the securing mechanism being folded in a u-shape such that the bottom face at the first end is proximate to the bottom face at the second end defining a channel; and an attachment mechanism configured to associate the securing mechanism with the mobile device; and a seatbelt buckled across the vehicle seat, the seatbelt comprising a lap portion and a shoulder portion extending through the channel of the securing mechanism;

wherein the mobile device is oriented within the vehicle such that the first end of the securing mechanism and the second end of the securing mechanism are towards a front end of the vehicle.

8. The system of claim 7, the attachment mechanism comprising an adhesive, a hook and loop structure, a bolt, a clip, or a weld.

9. The system of claim 7, the attachment mechanism comprising a set of holes through the top face and the bottom face configured to receive a set of bolts.

10. The system of claim 9, wherein the set of bolts extend through the set of holes and into the mobile device to associate the securing mechanism with the mobile device.

11. The system of claim 10, wherein the set of bolts extend through the set of holes and into a case for the mobile device to associate the securing mechanism with the mobile device.

12. The system of claim 7, wherein the securing mechanism is associated with a bottom face of the mobile device.

13. The system of claim 7, wherein the securing mechanism is associated with a bottom of a case for the mobile device.

14. The system of claim 7, wherein the securing mechanism is associated with the mobile device at a point below a center of gravity of the mobile device.

* * * * *